United States Patent [19]
Epworth et al.

[11] Patent Number: 6,144,783
[45] Date of Patent: *Nov. 7, 2000

[54] OPTICAL MULTIPLEXTER/DEMULTIPLEXER

[75] Inventors: Richard Edward Epworth, Sawbridgeworth; Terry Bricheno, Great Sampford; George Horace Brooke Thompson, Sawbridgeworth, all of United Kingdom

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 09/194,004
[22] PCT Filed: Jul. 30, 1997
[86] PCT No.: PCT/GB97/02051
 § 371 Date: Nov. 16, 1998
 § 102(e) Date: Nov. 16, 1998
[87] PCT Pub. No.: WO98/04944
 PCT Pub. Date: Feb. 5, 1998

[30] Foreign Application Priority Data

Jul. 30, 1996 [GB] United Kingdom .................. 9615962

[51] Int. Cl.⁷ ....................................... G02B 6/28
[52] U.S. Cl. ................................ 385/24; 385/46; 385/31; 385/27; 385/28
[58] Field of Search ................................ 385/24, 10, 14, 385/27, 28, 31, 37, 39, 46; 359/124, 130, 161

[56] References Cited

U.S. PATENT DOCUMENTS 5,881,199  3/1999  Li .......................................... 385/14 X

*Primary Examiner*—Phan T. H. Palmer
*Attorney, Agent, or Firm*—Lee, Mann, Smith, McWilliams, Sweeney & Olson

[57] ABSTRACT

An optical multiplexer/demultiplexer with an improved spectral characteristic is provided by two diffraction gratings (61, 60) arranged optically in tandem, the gratings being arranged to provide free spectral ranges differing by a factor of at least two, and having a coupling between them that carries over into the second grating information concerning the dispersion afforded by the first grating.

13 Claims, 8 Drawing Sheets

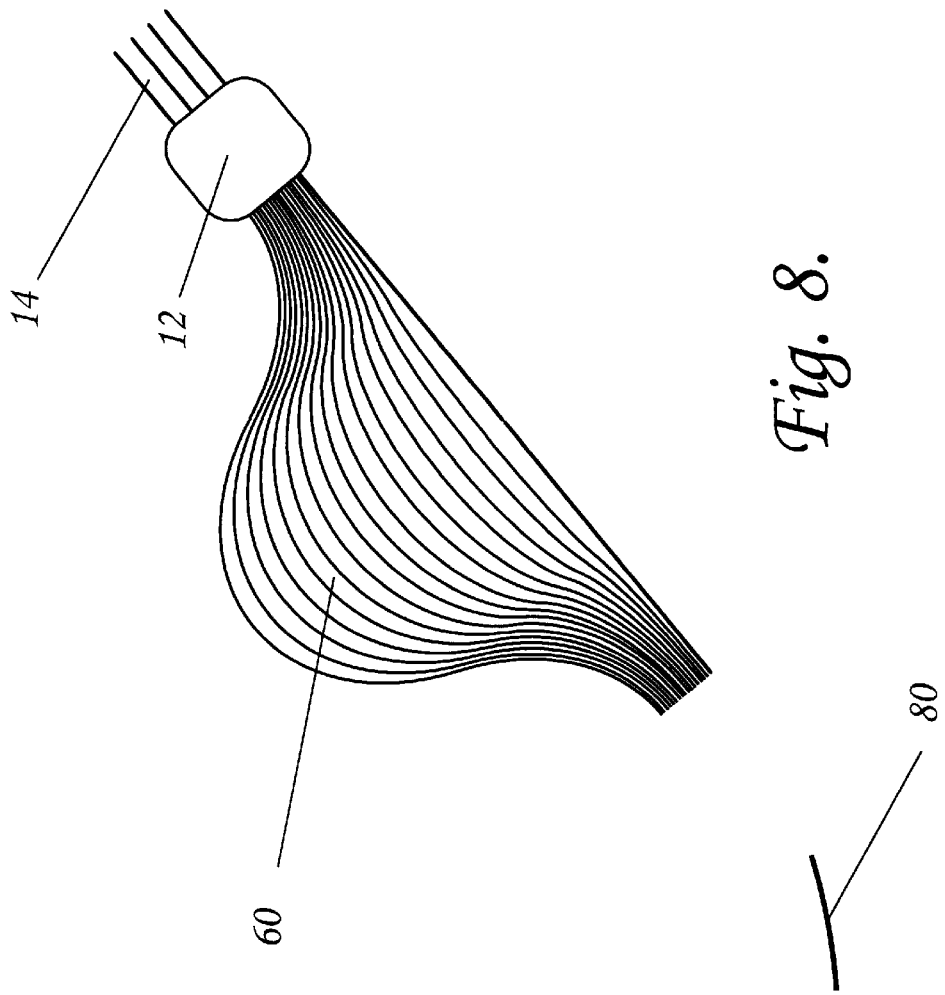
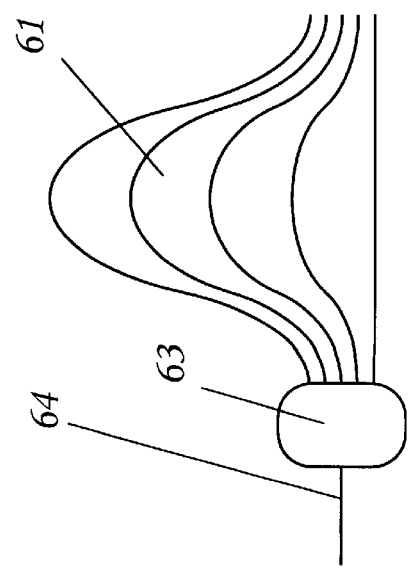
Fig. 8.

OPTICAL MULTIPLEXTER/ DEMULTIPLEXER

BACKGROUND OF THE INVENTION

Optical Wavelength Division Multiplexed (WDM) systems ideally require passive optical wavelength multiplexers and demultiplexers which have isolated pass-bands which are flat-topped so as to allow a measure of tolerance in the spectral positioning of the individual signals of the WDM system within these pass-bands. One method of multiplexing or demultiplexing channels in an optical WDM system relies upon the use of multilayer dielectric interference filters. Another relies upon Bragg reflection effects created in optical fibres. A third method, the method with which the present invention is particularly concerned, relies upon diffraction grating effects.

One form that such a diffraction grating can take for wavelength multiplexing/demultiplexing is the form described in EP 0 254 453, which also refers, with particular reference to its FIG. 5, to the possibility of having a tandem arrangement of two diffraction gratings arranged to provide a combined intensity transfer function that is the product of the intensity transfer function of its component diffraction grating 40 with that of its component diffraction grating 42.

An alternative form that such a diffraction grating can take is an optical waveguide grating that includes a set of optical waveguides in side-by-side array, each extending from one end of the array to the other, and being of uniformly incrementally greater optical path length from the shortest at one side of the array to the longest at the other. Such an optical grating constitutes a component of the multiplexer described by C Dragone et al., 'Integrated Optics N×N Multiplexer on Silicon', IEEE Photonics Technology Letters, Vol. 3, No. 10, October 1991, pages 896–9. Referring to FIG. 1, the basic components of a 4-port version of such a multiplexer comprise an optical waveguide grating, indicated generally at 10, where two ends are optically coupled by radiative stars, indicated schematically at 11 and 12, respectively with input and output sets of waveguides 13 and 14. Monochromatic light launched into one of the waveguides of set 13 spreads out in radiative star 11 to illuminate the input ends of all the waveguides of the grating 10. At the far end of the grating 10 the field components of the emergent light interfere coherently in the far-field to produce a single bright spot at the far side of the radiative star 12. Scanning the wavelength of the light causes a slip in the phase relationship of these field components, with the result that the bright spot traverses the inboard ends of the output set of waveguides 14 linearly with wavelengths as depicted at 15. If the mode size of the waveguides 14 is well matched with the size of the bright spot, then efficient coupling occurs at each of the wavelengths at which the bright spot precisely registers with one of those waveguides 14. Either side of these specific wavelengths the power falls off in a typically Gaussian manner as depicted at 15. While this may allow acceptable extinction to be achieved between channels, it is far from the ideal of a flat-topped response.

A tandem arrangement of this alternative form of diffraction grating can also be constructed, an example of such an arrangement being described in EP 0 591 042 with particular reference to its FIG. 3. This tandem arrangement similarly provides a combined intensity transfer function that is the product of the intensity transfer functions of its two component diffraction gratings. The response of this tandem arrangement also provides a typically Gaussian fall off in power that is similarly far from the ideal of a flat-topped response.

SUMMARY OF THE INVENTION

The present invention is directed to the provision of an optical multiplexer/demultiplexer that achieves a response that is more nearly flat-topped without introducing excessive insertion loss.

According to the present invention there is provided an optical multiplexer/demultiplexer for the multiplexing/ demultiplexing of optical signal channels at a substantially uniform optical frequency spacing, which multiplexer/ demultiplexer includes a set of input/output ports optically coupled with an output/input port via a tandem arrangement of first and second diffraction gratings that provide multiple optical paths from each member of the set of input-output ports to the output/input port via different grating elements of the gratings, wherein the difference in optical path length occasioned by paths via adjacent elements of the first grating is greater than that occasioned by paths via adjacent elements of the second grating, wherein said difference in optical path length defines for its associated grating a frequency range, the Free Spectral Range, being the frequency range over which said optical path length difference produces a phase difference whose value ranges over $2\pi$, wherein the Free Spectral Range of the first diffraction grating is matched with the optical frequency spacing of the optical signal channels, wherein the Free Spectral Range of the second diffraction grating is at least as great as the difference in frequency between the highest and lowest frequency channels of the multiplexer/demultiplexer, and wherein the portion of the optical coupling between the set of input/output ports and the output/input port that extends between the first and second diffraction gratings couples spatial information between the two gratings in addition to intensity information.

Insofar as an optical multiplexer/demultiplexer according to the present invention employs a tandem arrangement of first and second diffraction gratings, it bears a superficial resemblance to the prior art tandem arrangements referred to above with particular reference to EP 0 591 042 and EP 0 254 453. The mode of operation, and the type of response is able to provide, is however quite different. In the prior art arrangements, the optical coupling between the first and second gratings is essentially single mode, and therefore couples intensity information between the two gratings, but no spatial information. This means that each of the prior art tandem arrangements is functioning to provide a simple concatenation of wavelength filtering of its component parts, and the dispersion provided by the second grating is itself unaffected by the dispersion presented by the first grating. In an optical multiplexer/demultiplexer according to the present invention, the optical coupling between the first and second gratings couples both intensity and spatial information between the two gratings so that this coupling is therefore able to carry over into the second grating information concerning the dispersion afforded by the first grating. This makes wavelength dependent the geometry of the launch of light into the second grating from the first. Instead of providing a mere concatenation of wavelength filtering, the two component gratings of an optical multiplexer/ demultiplexer according to the present invention provide a concatenation of the dispersions of the two gratings.

BRIEF DESCRIPTION OF DRAWING

There follows a description of a multiplexer/ demultiplexer embodying the invention in a preferred form.

This description is prefaced with a description concerning the underlying principles of operation of the invention. The description refers to the accompanying drawings in which FIG. 1 (to which previous reference has already been made) schematically depicts a prior art optical multiplexer/demultiplexer employing an optical waveguide type diffraction grating, FIG. 8 is a schematic diagram of a multiplexer/demultiplexer as depicted in FIG. 6, and in which the two constituent diffraction gratings are optically coupled by a concave reflector.

DESCRIPTION OF THE PREFERRED EMBODIMENT

Figure 1:
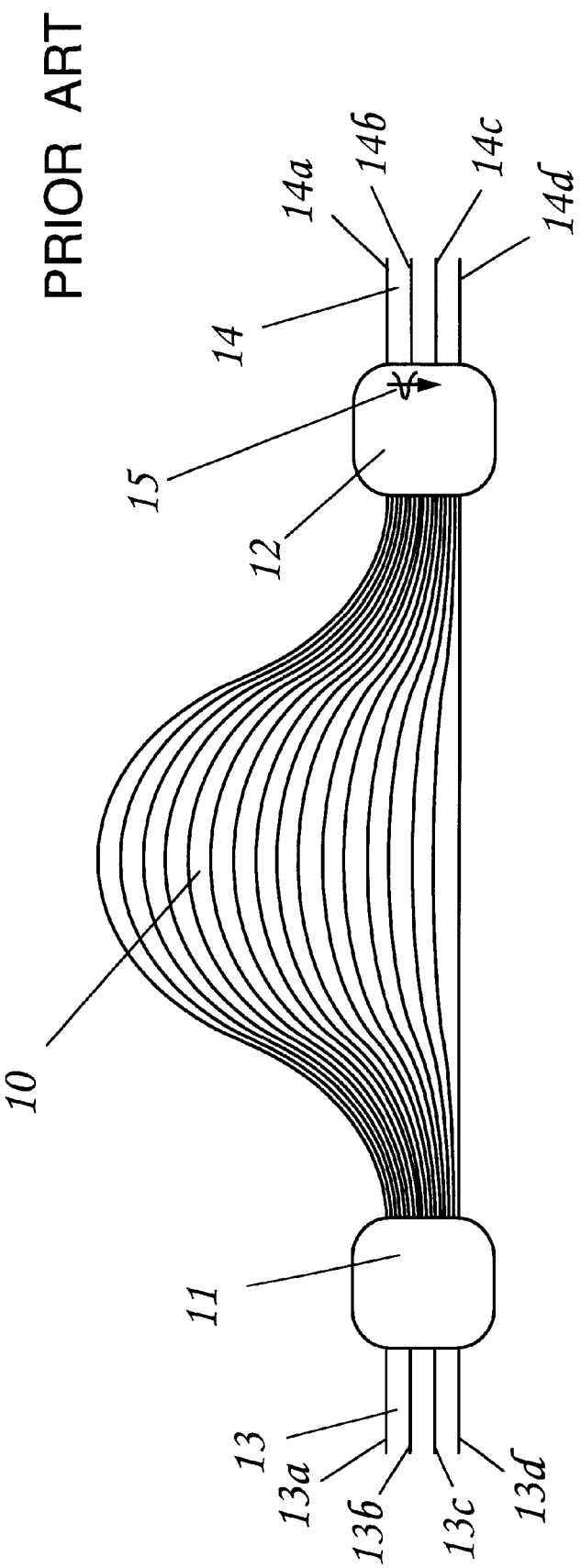

Referring once again to FIG. 1, it has been mentioned previously that, if monochromatic light is launched into one of the input waveguides 13, then the optical waveguide grating 10 acts on this light to form a spot of light 15 on the inboard end of the set of output waveguides 14, and that changing the wavelength (frequency) of the launched light causes the spot to move across the inboard ends of the individual waveguides on the output set 14. As a result of this movement the optical power launched into any particular one of the waveguides of output set 14 shows a spectral characteristic as depicted at 20 in FIG. 2, while that of an adjacent waveguide of set 14 is depicted by the broken line 21. (In FIG. 2 the spectral characteristics have been depicted as a function of optical frequency rather than wavelength for a reason which will be explained in the next paragraph). With the grating having equal optical path length increments between adjacent members of its component waveguides, the position of the spot of light on the inboard end of the output set of waveguides 14 is determined by the phase relationship between the two components of the light emerging from any adjacent pair of waveguides of the grating 10 into the radiative star 12.

Figure 3:
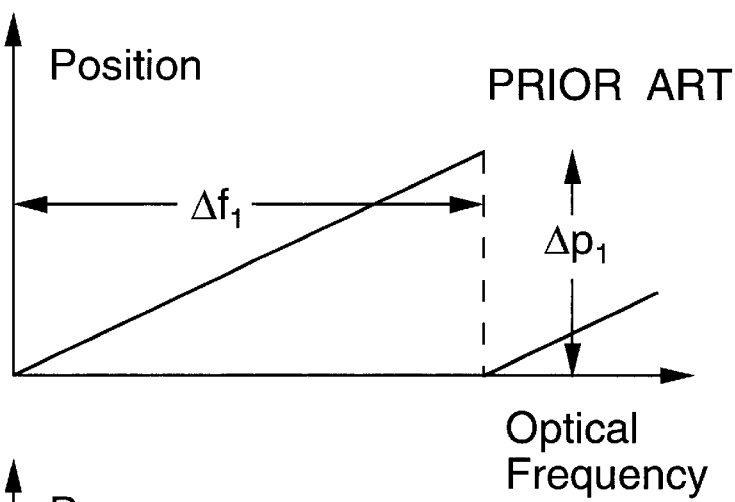
FIG. 3 is a plot of the movement of the spot of light across the inboard ends of the output waveguides of the multiplexer/demultiplexer of FIG. 1 produced by changing the optical frequency of light launched into a selected one of its input waveguides.

This phase relationship is determined by the difference in optical path length (the product of the effective refractive index with the difference in physical path length) of the adjacent waveguides and by the wavelength (frequency) of the light. Accordingly, changing the wavelength (frequency) of the light by an amount that changes the phase relationship by $2\pi$ will bring the spot of light back to its former position. The magnitude of this change, expressed as a frequency difference, is termed the Free Spectral Range (FSR) of the grating 10. (It is preferred for FSR to be expressed in terms of a frequency difference, rather than a wavelength difference, so that its magnitude remains constant across the frequency spectrum). FIG. 3 depicts the position, as a function of optical frequency, of the spot of light on the inboard end of this set of waveguides 14, where the magnitude of the FSR is $\Delta f_1$. The magnitude of the FSR is determined, as has been stated above, by the difference in optical path length between adjacent waveguides of the grating 10. The range of position $\Delta p_1$ of the spot of light is a quantity whose magnitude is determined by a number of parameters associated with the configuration of the waveguides of the grating 10, and hence the magnitudes of $\Delta f_1$ and $\Delta p_1$ can be varied independently of each other. A diffraction grating is a dispersion device, and the dispersion of this diffraction grating is given by the ratio $\Delta p_1/\Delta f_1$.

Figure 2:
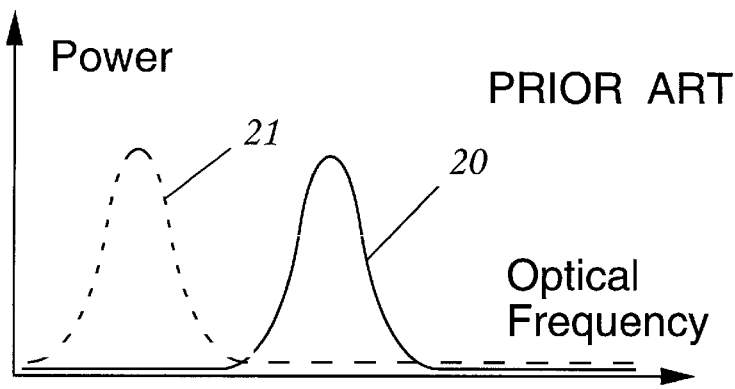
FIG. 2 is a plot of the spectral characteristic of the multiplexer/demultiplexer of FIG. 1.
Figure 4:
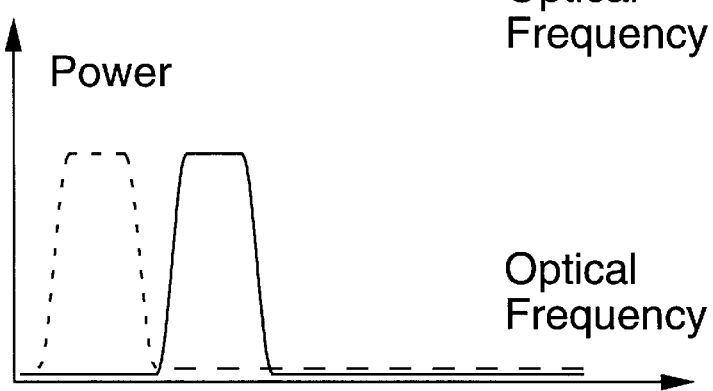
FIGS. 4 and 5 are plots corresponding respectively to the plots of FIGS. 2 and 3, but in respect of a notional multiplexer/demultiplexer having more desirable spectral characteristics than those of the multiplexer/demultiplexer of FIG. 1.

The spectral characteristic 20 of FIG. 2 falls short of ideal for a multiplexer/demultiplexer because the steady movement, with change of optical frequency, of the spot of light across the inboard end of the set of waveguides 14, as depicted in FIG. 3, provides the characteristic 20 with an approximately Gaussian profile, rather than one which is relatively flat-topped and has a fast roll-off at each end of its pass-band. To achieve the desired form of profile, as depicted in FIG. 4, without loss of light requires a spot movement of the form depicted in FIG. 5 in which there are ranges 50 of optical frequency over which there is substantially no movement of the spot, these ranges being interspersed with narrow ranges 51 in which the movement is rapid.

Figure 5:
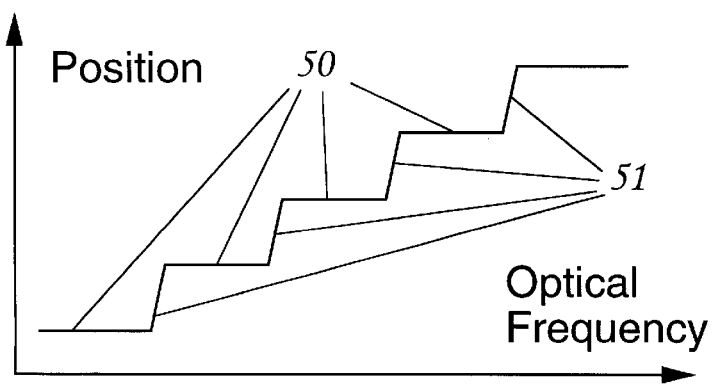
Figure 6:
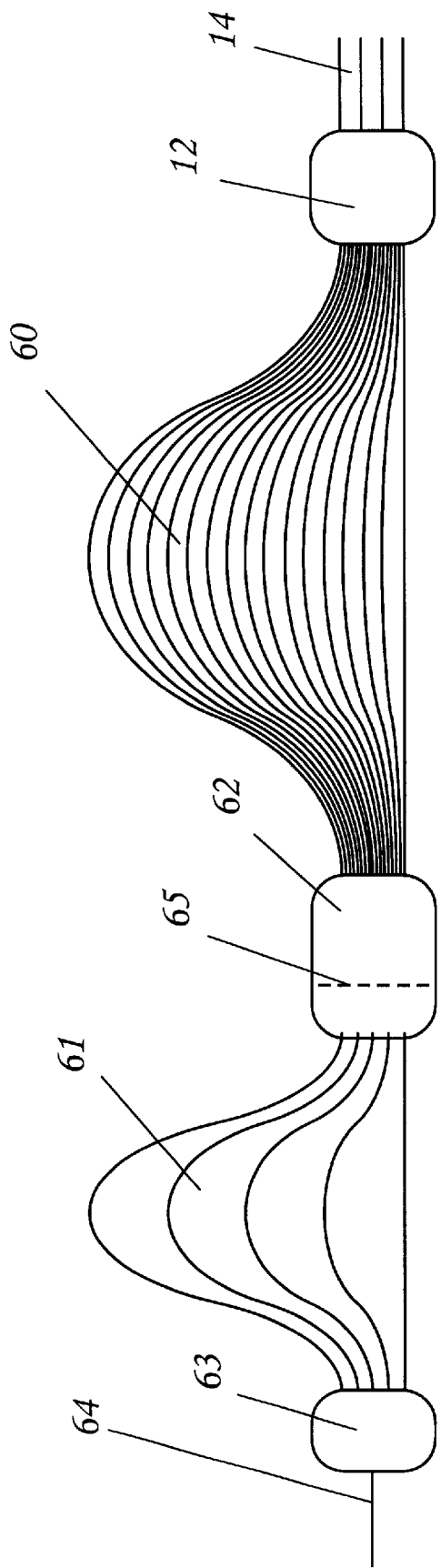
FIG. 6 is a schematic diagram of an optical multiplexer/demultiplexer embodying the present invention in a preferred form.

The present invention enables the production of a characteristic approximating to that of FIG. 5 by the use, as schematically depicted in FIG. 6, of two gratings 60, 61 optically in tandem, these gratings exhibiting FSRs that differ in magnitude by a factor at least equal to the number of channels being separated. Grating 60 corresponds to grating 10 of FIG. 1 and, under the assumption that the left-hand side of the diagram is the input side, the output side to this grating is unchanged. On the input side of grating 60, the radiative star coupling 11 is replaced by a coupling region 62 which provides optical coupling between grating 60 and grating 61. On the input side of grating 61 is a further optical coupling region 63 which, optically couples a single waveguide 64 with the input end of the input of grating 61. The coupling regions 12 and 63 have been depicted as radiative star type couplings, though alternative forms are also possible. Each of these coupling regions functions as a device performing a Fourier Transform converting positional information into angular information, or vice versa. The coupling region 63 is in effect a tandem arrangement of two conventional type radiative stars arranged back-to-back and meeting in an 'image plane' 65. The first radiative star component of coupling region 63 operates to convert angular information received from one to the gratings into positional information at the 'image plane' 65, while the second converts it back into angular information again for launching into the other grating. Thus it is seen that this coupling region 63 couples both intensity and spatial information between the two gratings. (The two component radiative stars of coupling region 63 may normally be designed to meet in an 'image plane' that is indeed a planar surface, but for certain geometries it may be prefered for this surface to have a curvature.)

Figure 7:
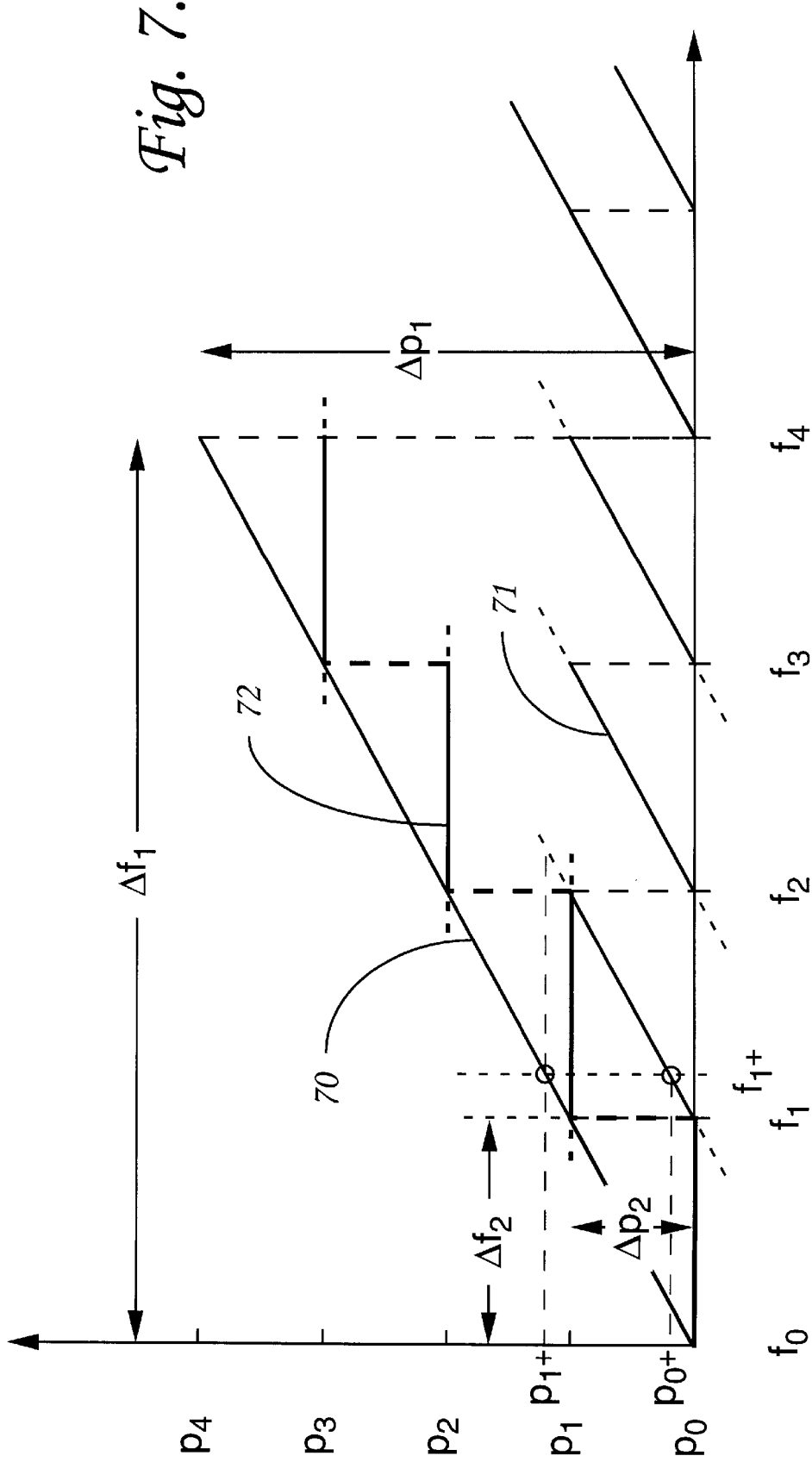
FIG. 7 depicts three plots corresponding to the plot of FIG. 3 respectively in respect of the first diffraction grating of the multiplexer/demultiplexer of FIG. 6, in respect of the second grating, and in respect of the grating combination.

Suppose by way of example that grating 61 has an FSR, $\Delta f_2$, that is a quarter of the FSR, $\Delta f_1$, of grating 60, and that the range of position, $\Delta p_2$, of grating 61 is a quarter of that, $\Delta p_1$, of grating 60 so that the two gratings have matching dispersions, $\Delta p_1 \Delta f_1 = \Delta p_2 \Delta f_2$. Under these conditions, sawtooth trace 70 of FIG. 7 depicts the movement of the spot of light at the output end of grating 60 in response to change of frequency of light applied to its input end at a fixed position, while trace 71 is an analogous trace in respect of the grating 61. For light launched into grating 61 by way of waveguide 64, a change of frequency from $f_0$ to $f_1$ will shift the spot of light it forms at the 'image plane' 65 of coupling 62 from position $p_0$ to $p_1$. A convenient way of finding out what happens to this light in its passage through grating 60 is to rely upon the reciprocal nature of the propagation of light through such a structure, and to consider, in the first instance, what would happen to light if that light were launched into grating 60 so as to propagate in the reverse direction. For light launched into grating 60 by way of a particular one of the set of waveguides 14, a change in frequency from $f=f_0$ to $f=f_1$ will similarly shift the spot of light it forms in the 'image' plane 65 from $p_0$ to $p_1$. Reciprocity considerations dictate therefore that, if light is launched into grating 60 from the 'image' plane 65 with its frequency swept from $p_0$ to $p_1$, then that light will emerge from the grating 60 by way of the particular one of the set of waveguides 14. Accordingly, over this range of frequencies $f_0 \leq f \leq f_1$, light that is launched into waveguide 64 will emerge from the tandem arrangement of the two gratings 61 and 60 by way of the particular one of the waveguides 14.

To understand what happens light in the frequency range $f_1 \leq f \leq f_2$, in its passage through grating 60, reference may be made back to FIG. 1. Labelling the individual members of the sets of waveguides 13 and 14 individually as 13a, 13b, 13c, 13d, 14a, 14b, 14c and 14d, it will be assumed by way of example that, for an input launched into waveguide 13d, the arrangement of FIG. 1 acts as a demultiplexer with outputs at frequencies $(f_4+f_3)/2$, $(f_3+f_2)/2$, $(f_2+f_1)/2$ and $(f_1+f_0)/2$ appearing respectively on waveguides 14a, 14b, 14c and 14d. By virtue of the reciprocity of light, it is then evident that an input at the frequency $(f_2+f_1)/2$ launched into waveguide 14c will produce an output on waveguide 13d. Then, by virtue of the physical symmetry of the arrangement of FIG. 1, it is evident that an input at the frequency $(f_2+f_1)/2$ launched into waveguide 13c will produce an output on waveguide 14d. Referring back to FIG. 6, it is seen therefore that, over the frequency range $f_1 \leq f \leq f_2$, the light launched into waveguide 64 will emerge from the waveguide of the set of waveguides 14 that is adjacent to the one from which light emerges over the frequency range $f_0 \leq f \leq f_1$. A similar situation can be seen to pertain in respect of the frequency ranges $f_2 \leq f \leq f_3$ and $f_3 \leq f \leq f_4$. Accordingly the position of the spot of light at the inboard end of the set of waveguides 14 follows the path indicated generally by trace 72 in FIG. 7.

In the foregoing analysis no account has been taken of the fact that the FSR does not provide an absolute limit to the movement of the spot produced in the 'image' plane 65. In fact when the frequency is at $f_0+$ such as to produce a principal spot at $p_0+$, a weak spot is also liable to be formed at $p_1+$. Such weak spots can conveniently be eliminated by the use of a field stop positioned to block all the light except for a window extending from slightly above $p_0$ to slightly below $p_1$, the margins above $p_0$ and below $p_1$, being provided to accommodate the fact that the spot size is finite. This is not a necessary requirement. It may for instance be unnecessary if it is known that there will never be optical power within these spectral ranges because they lie in inter-channel guard-spaces of the optical transmission system in which the multplexer/demultiplexer is designed to operate.

One possible form for the coupling region 62 is provided by a concave reflector as depicted at 80 in FIG. 8. The length of the reflector acts as a kind of field stop which may be used to ensure that only the wanted diffraction order, or a portion thereof, of grating 60 is transmitted between the two gratings 60 and 61. The arrangement depicted constitutes a 1×N (N=4 illustrated by way of specific example) multiplexer/demultiplexer. This arrangement can be adapted to form an M×N device, a passive wavelength cross-connect, by the inclusion of additional gratings 61 (not shown) each optically coupled with grating 60 by different, physically separated, sections of the reflector 80.

An alternative way of coupling the output of the first optical waveguide grating array into the second is to effect lateral coupling between all the guides of the first grating at their output ends and their nearest neighbours, and to position the termination of the coupler at the focal plane of the input star of the second grating. The coupler is formed by arranging the guides closely alongside each other and adjusting their relative spacing, their relative propagation velocities and the total length of the coupler in such a way that, when light at the input is divided amongst all the guides, light at the output is restricted predominantly either to a single guide or to two adjacent guides, and that this light moves across the array at the output of the coupler as the relative phase of the light across the array at the input to the coupler changes with wavelength. This design has the advantage of eliminating the need for a spatial filter, and also exploits the coupling between closely spaced adjacent guides, which is otherwise a distracting characteristic that inevitably occurs at the point where the guides are brought together at the input to the radiative star.

The number of waveguides in the grating determines the amount the spot moves relative to its size over its FSR, the ratio being directly proportional to the number of guides. Therefore the more guides there are in the compensating grating, the grating with the smaller FSR, the larger is the proportion of its FSR that the centre of the spot may move before either of its edges encounters the edge of the field stop, and hence the wider is the flat top of the final response relative to the channel spacing. At least three or four guides are therefore typically required in this grating. The number of guides in the main grating is increased over those in the compensating grating typically by a factor not less than the number of channels, and preferably to about one and a half times the number of channels.

The foregoing specific description has related exclusively to multiplexers/demultiplexers employing optical waveguide gratings, but it should be clearly understood that the invention is not limited exclusively to the use of this particular type of optical grating, but is applicable to multiplexers/demultiplexers employing optical diffraction gratings in general. Thus for instance the invention is applicable to multiplexers/demultiplexers employing the type of optical diffraction grating described in GB 2 222 891A.

Figure 9:
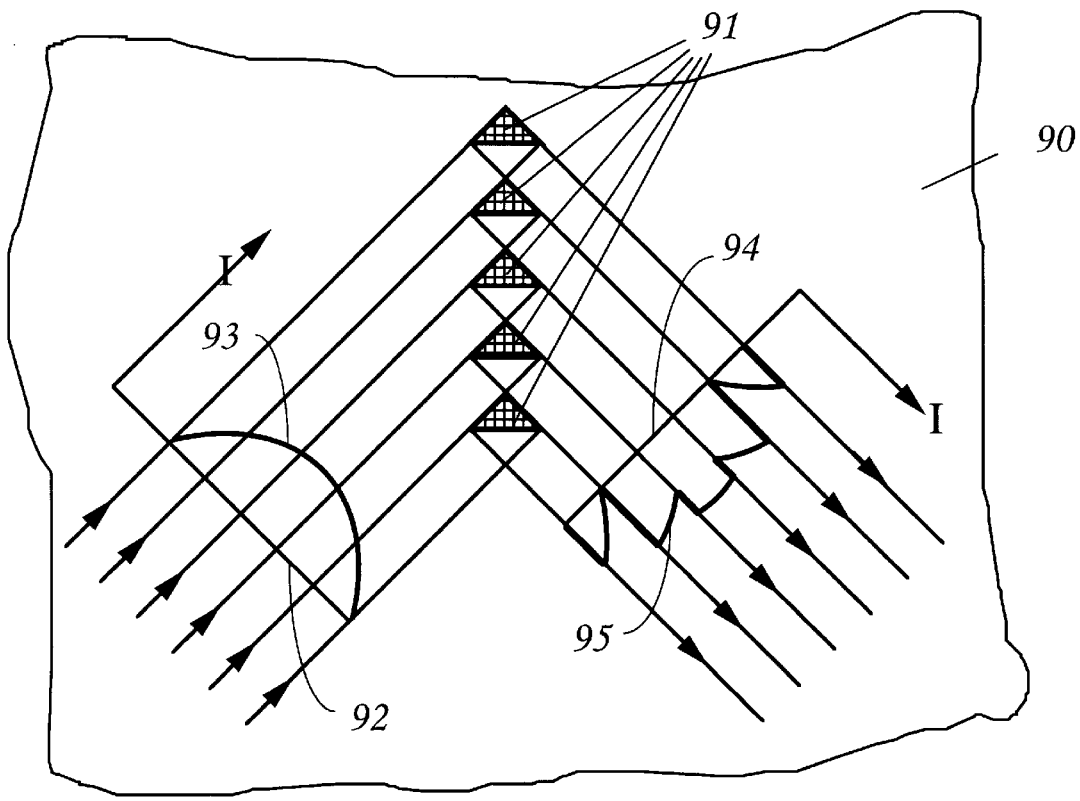
FIGS. 9 and 10 are diagrams of alternative forms of diffraction grating to replace the waveguide diffraction gratings of the multiplexer/demultiplexer of FIG. 6.
Figure 10:
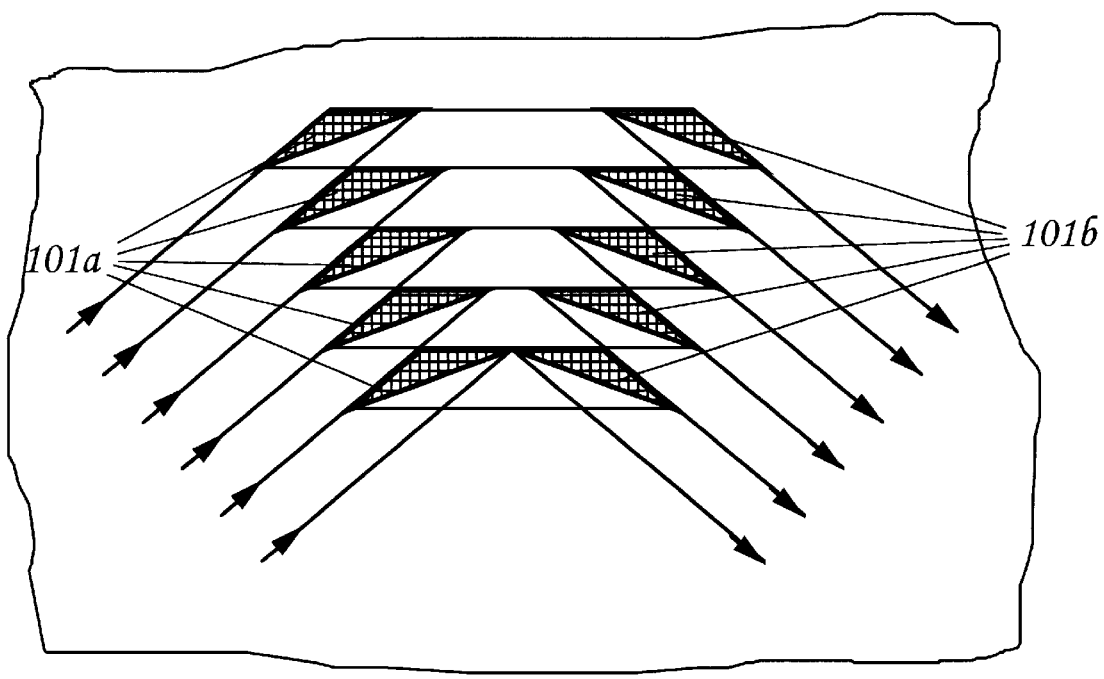

Such a grating is composed of a set of discrete wells or apertures formed in slab waveguide. In the case of a multiplexer/demultiplexer using a tandem arrangement of two diffraction gratings of this discrete aperture or well type, the grating with the larger FSR may have such a small number of grating elements that reflection in a single line of such elements produces an unacceptably large distortion of the power distribution across the diffracted beam. The way such distortion arises can be seen by reference to FIG. 9. This figure schematically depicts a portion of slab waveguide 90 provided with a set of apertures or wells 91 constituting the diffracting elements of the diffraction grating. A wavefront 92 incident upon the grating element is depicted as having an approximately Gaussian intensity profile 93. The grating elements act upon the wavefront 92 to produce a diffracted wavefront 94 with an intensity profile 95. The distortion problem may be avoided, as depicted in FIG. 10, by replacing the single line of diffracting elements 91 of FIG. 9 with a symmetrical arrangement of two lines 101a and 101b so that the components of the diffracted wavefront have each undergone a double reflection instead of a single one. The amount of distortion, as depicted at 95 in FIG. 9, provided by the single reflection can be seen to be reduced progressively as the number of diffraction elements is increased, and so a single reflection type grating will almost always prove satisfactory for the grating with the larger FSR on account of the larger number of elements that such a grating will normally have.

Figure 11:
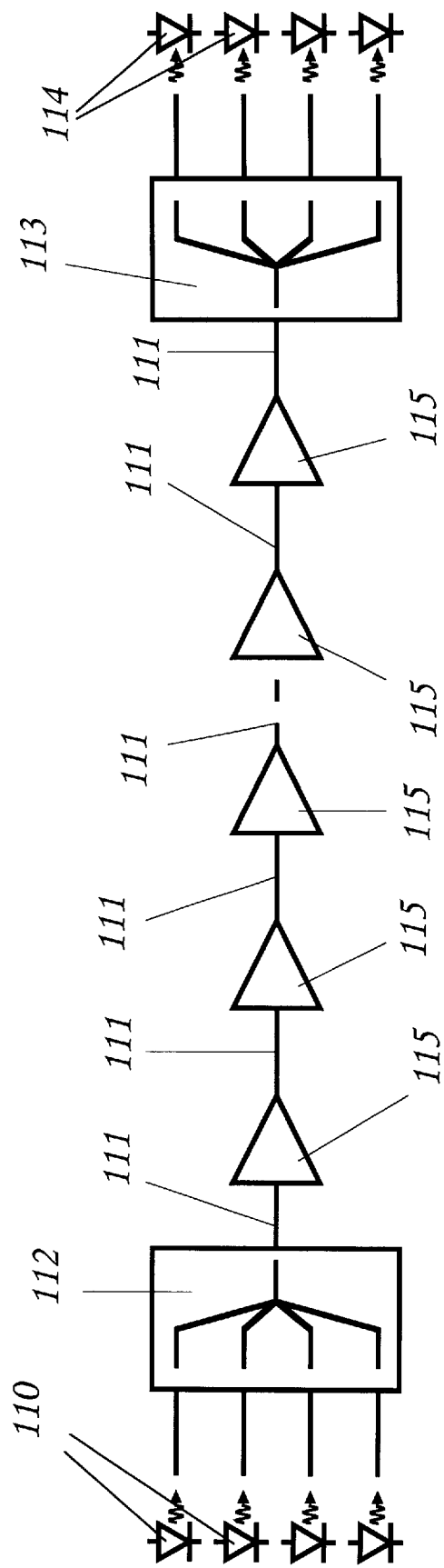
FIG. 11 is a schematic diagram of an optical transmission system incorporating a wavelength multiplexer at its transmitter end and a demultiplexer at its receiver end.

FIG. 11 is a schematic diagram of an optical transmission system that incorporates a wavelength multiplexer at its transmitter end and a demultiplexer at its receiver end, these being multiplexer/demultiplexers of the type described above with particular reference to FIGS. 6, 8 or 10. At the transmitter end, a number of optical sources, represented by laser diodes 110, are wavelength multiplexed on to a common signal channel 111 by a multiplexer 112. At the receiver end, a demultiplexer 113 separates the multiplexed signal into physically separated channels feeding respective detectors 114. Optionally, the common signal channel 111 may be divided into a number of component sections cascaded by optical amplifiers 115. Multiplexers/demultiplexers may also be included in at least some of the optical amplifiers 115.

Figure 12:
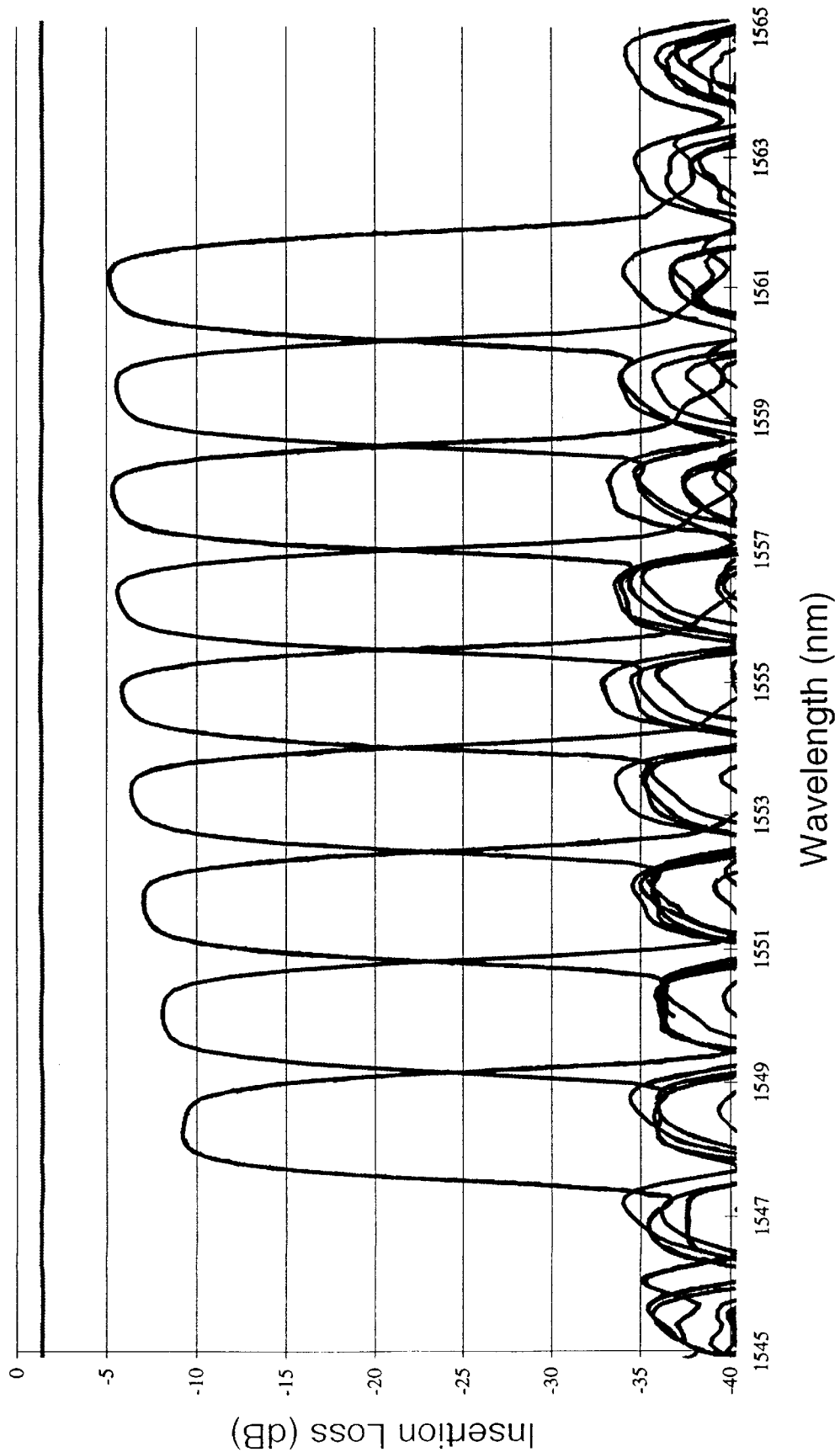
FIG. 12 is a plot of the measured spectral characteristics of a multiplexer/demultiplexer substantially as schematically depicted in FIG. 6.

FIG. 12 depicts the spectral characteristics of a particular physical example of an integrated optics multiplexer/demultiplexer made in accordance with the principles of the present invention from a tandem arrangement of gratings 61 and 60 whose arrangement is schematically depicted in FIG. 6. This arrangement included a field stop in the coupling region 62. FIG. 12 shows the superimposed traces obtained from a measurement of the output optical power from each one of a set of nine input/output channels 14 when an optical signal applied to the output/input channel 64 is swept in wavelength between 1545 nm and 1565 nm. In particular, FIG. 12 shows each channel to have a mid-channel insertion loss of less than 10 dB. If there were absolutely no guard space between the frequencies of adjacent adjacent channels the cross-talk between adjacent channels would be only about 15 dB below, but of necessity there must be some separation in frequency between adjacent channels, and so cross-talk between such channels will in fact be significantly better than 15 dB below. Cross-talk between non-adjacent channels will be lower still. The slight increase in mid-channel insertion loss in moving from the longest wavelength channel to the shortest, and the slight tilt of the pass-band of each channel, both indicate that the geometry of this particular multiplexer/demultiplexer is not fully optimised. (The horizontal trace appearing on FIG. 12 at about −2 dB is a measure of the insertion loss of a straight waveguide provided alongside the multiplexer/demultiplexer for comparison purposes.)

What is claimed is:

1. An optical multiplexer/demultiplexer for the multiplexing/demultiplexing of optical signal channels at a substantially uniform optical frequency spacing, which multiplexer/demultiplexer includes a set of input/output ports optically coupled with an output/input port via a tandem arrangement of first and second diffraction gratings that provide multiple optical paths from each member of the set of input-output ports to the output/input port via different grating elements of the gratings, wherein the difference in optical path length occasioned by paths via adjacent elements of the first grating is greater than that occasioned by paths via adjacent elements of the second grating, wherein said difference in optical path length defines for its associated grating a frequency range, the Free Spectral Range, being the frequency range over which said optical path length difference produces a phase difference whose value ranges over $2\pi$, wherein the Free Spectral Range of the first diffraction grating is matched with the optical frequency spacing of the optical signal channels, wherein the Free Spectral Range of the second diffraction grating is at least as great as the sum formed by the addition of the difference in frequency between adjacent frequency channels of the multiplexer/demultiplexer to the difference in frequency between the highest and lowest frequency channels of the multiplexer/demultiplexer, and wherein the portion of the optical coupling between the set of input/output ports and the output/input port that extends between the first and second diffraction gratings couples spatial information between the two gratings in addition to intensity information.

2. A wavelength division multiplexed optical transmission system including at least one multiplexer as claimed in claim 1.

3. A wavelength division multiplexed optical transmission as claimed in claim 2, wherein the first and second diffraction gratings of said at least one multiplexer are optical waveguide gratings.

4. A wavelength division multiplexed optical transmission as claimed in claim 3, wherein the dispersion of the first grating of said at least one multiplexer is substantially matched with that of the second.

5. A wavelength division multiplexed optical transmission system as claimed in claim 2, wherein the dispersion of the first grating of said at least one multiplexer is substantially matched with that of the second.

6. A wavelength division multiplexed optical transmission system including at least one demultiplexer as claimed in claim 1.

7. A wavelength division demultiplexed optical transmission system as claimed in claim 6, wherein in the first and second diffraction gratings of said at least one demultiplexer are optical waveguide gratings.

8. A wavelength division demultiplexed optical transmission system as claimed in claim 7, wherein the first and second diffraction gratings of said at least one demultiplexer are optical waveguide gratings.

9. A wavelength division multiplexed optical transmission system as claimed in claim 6, wherein the dispersion of the first grating of said at least one demultiplexer is substantially matched with that of the second.

10. An optical multiplexer/demultiplexer as claimed in claim 1, wherein the first and second diffraction gratings are optical waveguide diffraction gratings.

11. An optical multiplexer/demultiplexer as claimed in claim 10, wherein the dispersion of the first is substantially matched with that of the second.

12. An optical multiplexer/demultiplexer as claimed in claim 1, wherein the dispersion of the first grating is substantially matched with that of the second.

13. An optical multiplexer/demultiplexer as claimed in claim 1, wherein the first and second diffraction gratings are diffraction gratings whose diffracting elements are constituted by apertures or wells formed in slab waveguide.

* * * * *